US012277940B2

(12) United States Patent
Zhou

(10) Patent No.: US 12,277,940 B2
(45) Date of Patent: Apr. 15, 2025

(54) PACKET LOSS RECOVERY METHOD FOR AUDIO DATA PACKET, ELECTRONIC DEVICE AND STORAGE MEDIUM

(71) Applicant: APOLLO INTELLIGENT CONNECTIVITY (BEIJING) TECHNOLOGY CO., LTD., Beijing (CN)

(72) Inventor: Wenhuan Zhou, Beijing (CN)

(73) Assignee: APOLLO INTELLIGENT CONNECTIVITY (BEIJING) TECHNOLOGY CO., LTD., Beijing (CN)

( * ) Notice: Subject to any disclaimer, the term of this patent is extended or adjusted under 35 U.S.C. 154(b) by 290 days.

(21) Appl. No.: 17/931,174

(22) Filed: Sep. 12, 2022

(65) Prior Publication Data

US 2023/0005490 A1 Jan. 5, 2023

(30) Foreign Application Priority Data

Sep. 13, 2021 (CN) ......................... 202111069091.0

(51) Int. Cl.
*G10L 19/00* (2013.01)
*G10L 21/0316* (2013.01)

(52) U.S. Cl.
CPC ...... *G10L 19/0017* (2013.01); *G10L 21/0316* (2013.01)

(58) Field of Classification Search
CPC ..... G10L 19/00; G10L 19/0017; G10L 21/00; G10L 21/0316
See application file for complete search history.

(56) References Cited

U.S. PATENT DOCUMENTS 6,996,626 B1 2/2006 Smith
7,873,064 B1 * 1/2011 Li ......................... G10L 19/005 704/200

(Continued)

FOREIGN PATENT DOCUMENTS

CN 101281745 A 10/2008
CN 101588341 A 11/2009

(Continued)

OTHER PUBLICATIONS

European Search Report issued in European Application No. 22195091.8, mailed on Jan. 7, 2023 (13 pages).

(Continued)

*Primary Examiner* — Daniel C Washburn
*Assistant Examiner* — Sean E Serraguard
(74) *Attorney, Agent, or Firm* — Osha Bergman Watanabe & Burton LLP

(57) ABSTRACT

The disclosure provides a packet loss recovery method for an audio data packet an electronic device and a storage medium. The method includes: receiving an audio data packet sent by a vehicle-mounted terminal, and identifying a discarded first sampling point set in response to detecting packet loss; obtaining a second sampling point set and a third sampling point set each adjacent to the first sampling point set, in which the second sampling point set is prior to the first sampling point set, the third sampling point set is behind the first sampling point set; and generating target audio data of the first sampling points based on first audio data sampled at the second sampling points and second audio data sampled at the third sampling points, and inserting the target audio data at sampling positions of the first sampling points.

16 Claims, 5 Drawing Sheets

(56) References Cited

U.S. PATENT DOCUMENTS

| | | | | |
|---|---|---|---|---|
| 2008/0118082 | A1 | 5/2008 | Seltzer et al. | |
| 2012/0197637 | A1* | 8/2012 | Gratke | G10L 21/02 704/226 |
| 2015/0371641 | A1 | 12/2015 | Bruhn | |
| 2019/0180770 | A1* | 6/2019 | Kothari | G06F 3/167 |
| 2020/0234720 | A1* | 7/2020 | Sung | G10L 21/038 |

FOREIGN PATENT DOCUMENTS

| | | | | |
|---|---|---|---|---|
| CN | 101958119 | A | | 1/2011 |
| CN | 101976567 | A | * | 2/2011 |
| CN | 108257610 | A | | 7/2018 |
| CN | 108510993 | A | * | 9/2018 |
| CN | 108696491 | A | | 10/2018 |
| CN | 109273006 | A | | 1/2019 |
| CN | 110290475 | A | | 9/2019 |
| CN | 111328061 | A | | 6/2020 |
| CN | 111627435 | A | | 9/2020 |
| CN | 112037781 | A | | 12/2020 |
| CN | 112634912 | A | | 4/2021 |
| EP | 1589330 | A1 | | 10/2005 |

OTHER PUBLICATIONS

Office Action issued in Chinese Application No. 202111069091.0 mailed on Aug. 1, 2023 (28 pages).

Yang Haisong, "The Evaluation of Speech Quality in Packet Loss Compensation", China Excellent Master's Degree Thesis, Dec. 31, 2011 (40 pages).

* cited by examiner

PACKET LOSS RECOVERY METHOD FOR AUDIO DATA PACKET, ELECTRONIC DEVICE AND STORAGE MEDIUM

CROSS REFERENCE TO RELATED APPLICATIONS

This application is based on and claims priority to Chinese patent applications Serial No. 202111069091.0 filed on Sep. 13, 2021, the entire contents of which are incorporated herein by reference.

TECHNICAL FIELD

The disclosure relates to a technical field of data processing, in particular to a technical field of artificial intelligence (AI) such as voice technology, Internet of Vehicles, intelligent cockpit, and intelligent transportation.

BACKGROUND

In an interaction scenario where a vehicle and a mobile phone are interconnected, packet loss may occur in audio data, which will lead to a poor quality of an audio source and affect a recognition efficiency of a speech engine. However, an existing solution to the quality problem of the audio source will result in a larger amount of transmitted data, and will test the compatibility and performance of the vehicle. Therefore, how to better avoid packet loss in the audio data is urgent to be solved.

SUMMARY

The embodiments of the disclosure provide a packet loss recovery method for an audio data packet, an electronic device, a storage medium and a computer program product.

According to a first aspect of the disclosure, a packet loss recovery method for an audio data packet is provided. The method includes: receiving an audio data packet sent by a vehicle-mounted terminal, and identifying a discarded first sampling point set in response to detecting packet loss, in which the first sampling point set includes N first sampling points, and N is a positive integer; obtaining a second sampling point set and a third sampling point set each adjacent to the first sampling point set, in which the second sampling point set is prior to the first sampling point set, the third sampling point set is behind the first sampling point set, the second sampling point set includes at least N second sampling points, and the third sampling point set includes at least N third sampling points; and generating target audio data of the first sampling points based on first audio data sampled at the second sampling points and second audio data sampled at the third sampling points, and inserting the target audio data at sampling positions of the first sampling points.

According to a second aspect of the disclosure, an electronic device is provided. The electronic device includes: at least one processor and a memory communicatively coupled to the at least one processor. The memory stores instructions executable by the at least one processor, and when the instructions are executed by the at least one processor, the packet loss recovery method for an audio data packet according to embodiments of the first aspect of the disclosure is implemented.

According to a third aspect of the disclosure, a non-transitory computer-readable storage medium having computer instructions stored thereon is provided. The computer instructions are configured to cause a computer to implement the packet loss recovery method for an audio data packet according to embodiments of the first aspect of the disclosure.

It should be understood that the content described in this section is not intended to identify key or important features of the embodiments of the disclosure, nor is it intended to limit the scope of the disclosure. Additional features of the disclosure will be easily understood based on the following description.

BRIEF DESCRIPTION OF THE DRAWINGS

The drawings are used to better understand the solution and do not constitute a limitation to the disclosure, in which.

DETAILED DESCRIPTION

The following describes the exemplary embodiments of the disclosure with reference to the accompanying drawings, which includes various details of the embodiments of the disclosure to facilitate understanding, which shall be considered merely exemplary. Therefore, those of ordinary skill in the art should recognize that various changes and modifications can be made to the embodiments described herein without departing from the scope and spirit of the disclosure. For clarity and conciseness, descriptions of well-known functions and structures are omitted in the following description.

In order to facilitate understanding of the disclosure, the technical fields involved in the disclosure are briefly explained in the following contents.

Data processing refers to collection, storage, retrieval, processing, transformation and transmission of data. Data processing can extract and deduce valuable and meaningful data for some specific people from a large amount of disorganized and incomprehensible data.

The key technologies of speech technology in the computer field include an automatic speech recognition technology and a speech synthesis technology. It is a future development direction of human-computer interaction that computers are enabled to hear, see, speak, and feel. Voice has become the most promising human-computer interaction method in the future, which is advantaged over other interaction methods.

Intelligent transportation is a real-time, accurate and efficient comprehensive transportation management technology that covers a wide range and play a role in all directions. Intelligent transportation is established by effectively integrating advanced information technology, data communication transmission technology, electronic sensing technology, control technology and computer technology into the entire ground traffic management system.

AI is the study of making computers to simulate certain thinking processes and intelligent behaviors of people (such as learning, reasoning, thinking and planning), which has both hardware-level technologies and software-level technologies. AI hardware technologies generally include technologies such as sensors, dedicated AI chips, cloud computing, distributed storage, and big data processing. AI software technologies mainly include computer vision technology, speech recognition technology, natural language processing (NLP) technology and machine learning, deep learning, big data processing technology, knowledge graph technology and other major directions.

Figure 1:
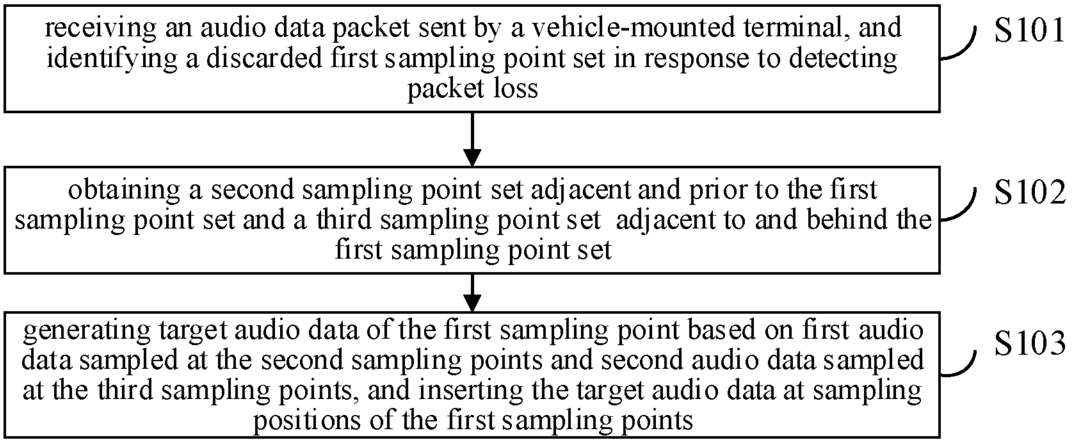
FIG. 1 is a flowchart of a packet loss recovery method for an audio data packet according to an embodiment of the disclosure.

FIG. 1 is a flowchart of a packet loss recovery method for an audio data packet according to an embodiment of the disclosure. As illustrated in FIG. 1, the method includes the following steps.

In S101, an audio data packet sent by a vehicle-mounted terminal is received, and a discarded first sampling point set is identified in response to detecting packet loss, in which the first sampling point set includes N first sampling points, and N is a positive integer.

In the embodiment of the disclosure, a terminal device may receive an audio data packet sent by a vehicle-mounted terminal through a communication link between the terminal device and the vehicle-mounted terminal. The terminal device and the vehicle-mounted terminal can be connected through a hotspot (Wi-Fi, Bluetooth), IrDA, ZigBee or USB.

The vehicle-mounted terminal is provided with an audio collection device, which may be, for example, a microphone (mic) or a pickup. The voice of a driver and passengers may be collected by the audio collection device.

The terminal device may be a mobile phone, a Bluetooth headset, a tablet computer, or a smart watch.

After receiving the audio data packet sent by the vehicle-mounted terminal, the terminal device needs to determine whether packet loss occurs in the audio data packet so as to determine a quality of the audio. In some implementations, since the audio data packet should be continuous in time sequence, it is possible to determine whether the packet loss occurs based on the time, and determine a discontinuous time as a packet loss time, so that a sampling point corresponding to the packet loss time is determined as a packet loss sampling point, which is also called the first sampling point. In other implementations, the vehicle-mounted terminal numbers each piece of data when collecting the audio data, and adjacent sequence numbers are continuous. In response to detecting that the sequence numbers are not continuous, it is determined that packet loss occurs in the audio data packet, then the sampling point corresponding to the missing sequence number is determined as the packet loss sampling point, which is called the first sampling point.

In S102, a second sampling point set and a third sampling point set each adjacent to the first sampling point set are obtained, in which the second sampling point set is prior to the first sampling point set, the third sampling point set is behind the first sampling point set, the second sampling point set includes at least N second sampling points, and the third sampling point set includes at least N third sampling points.

Based on a position where the packet loss occurs, the adjacent second sampling point set prior to the first sampling point set and the adjacent third sampling point set behind the first sampling point set are obtained.

Figure 2:
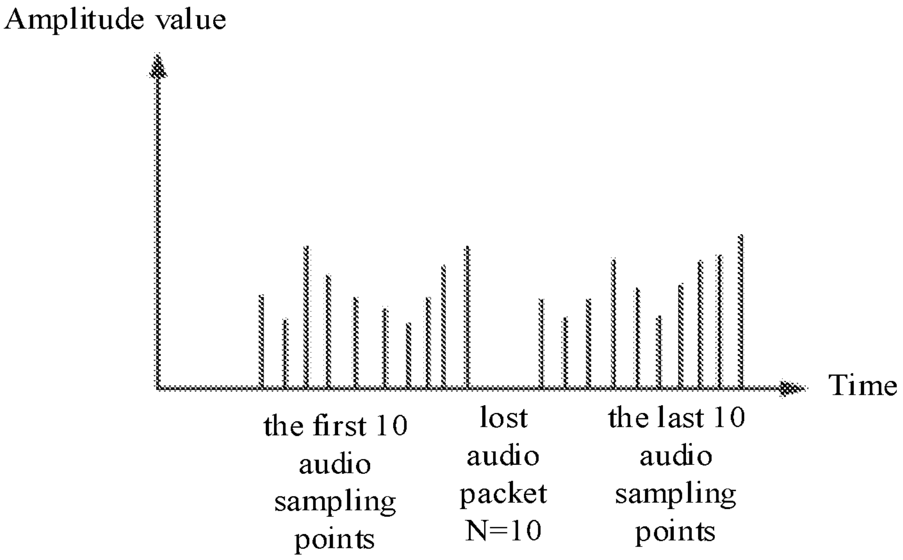
FIG. 2 is a schematic diagram of a sampling point set.

Taking FIG. 2 as an example, when the discarded first sampling point set includes the sampling points corresponding to sampling time points $t_{21}$ to $t_{30}$, the first 10 sampling points corresponding to sampling time points $t_{11}$ to $t_{20}$ can be collected as the second sampling point set, and the last 10 sampling points corresponding to sampling time points $t_{31}$ to $t_{40}$ are determined as the third sampling point set.

In order to ensure an accuracy of data recovery, a certain amount of audio data needs to be collected. In the disclosure, optionally, the number of the second sampling points in the second sampling point set, the number of the third sampling points in the third sampling point set, and the number of the first sampling points can be set as N. Optionally, more than N sampling points can be collected.

In S103, target audio data of the first sampling points is generated based on first audio data sampled at the second sampling points and second audio data sampled at the third sampling points, and the target audio data is inserted at sampling positions of the first sampling points.

According to the first audio data sampled at the second sampling points and the second audio data sampled at the third sampling points, the target audio amplitude values corresponding respectively to the first sampling points can be obtained. The target audio data corresponding to the first sampling points may be generated according to the target audio amplitude values corresponding respectively to the first sampling points. The target audio data is inserted into a sampling position of the first sampling points, so that there is corresponding audio data at each sampling time point, to make sure that the audio data packet is complete, and the packet loss recovery of the audio data packet is completed.

In the embodiment of the disclosure, the audio data packet sent by the vehicle-mounted terminal is received, and the discarded first sampling point set is identified in response to detecting packet loss. The first sampling point set includes N first sampling points, and N is a positive integer. The adjacent second sampling point set prior to the first sampling point set and the adjacent third sampling point set behind the first sampling point set are obtained, in which the second sampling point set includes at least N second sampling points, and the third sampling point set includes at least N third sampling points. The target audio data of the first sampling points is generated based on the first audio data sampled at the second sampling points and the second audio data sampled at the third sampling points, and the target audio data is inserted at the sampling positions corresponding respectively to the first sampling points. In the embodiment of the disclosure, the lost N data packets are recovered based on the adjacent N data packets prior to and the adjacent N data packets behind the packet loss position, which solves the problem of packet loss in audio transmission data of the vehicle and improves a quality of an audio source.

Figure 3:
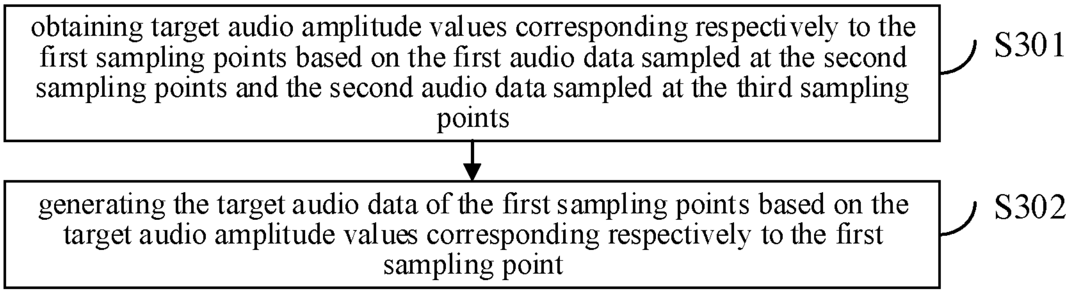
FIG. 3 is a flowchart of a packet loss recovery method for an audio data packet according to an embodiment of the disclosure.

FIG. 3 is a flowchart of a packet loss recovery method for an audio data packet according to an embodiment of the disclosure. On the basis of the above embodiments, in combination with FIG. 3, the process of generating the target audio data of the first sampling points based on the first audio data sampled at the second sampling points and the second audio data sampled at the third sampling points is described as follows. The process includes the following steps.

In S301, target audio amplitude values corresponding respectively to the first sampling points are obtained based on the first audio data sampled at the second sampling points and the second audio data sampled at the third sampling points.

In some embodiments, a first fitted curve is obtained based on the first audio data sampled at the second sampling points, and a second fitted curve is obtained based on the second audio data sampled at the third sampling points. For each first sampling point, the target audio amplitude value corresponding to the first sampling point is obtained based on the first fitted curve and the second fitted curve.

In some embodiments, a combination is obtained by combining one of the second sampling points in the second sampling point set with one of the third sampling points in the third sampling point set, then an average value of a second audio amplitude value of the second sampling point in the combination and a third audio amplitude value of the third sampling point in the combination is determined as the target audio amplitude value.

Optionally, the audio amplitude value of any sampling point can be obtained. One second sampling point is selected from the second sampling points in the second sampling point set successively according to a time sequence from early to late, one third sampling point is selected from the third sampling points in the third sampling point set successively according to a time sequence from late to early, and the second and third sampling points selected at the same n-th time are combined to obtain a combination, i.e., the second sampling point selected at the first time and third sampling point selected at the first time are combined as a combination, the second sampling point selected at the second time and third sampling point selected at the second time are combined as a combination, the second sampling point selected at the third time and third sampling point selected at the third time are combined as a combination, and so on. An average value of the second audio amplitude value of the second sampling point in the combination and the third audio amplitude value of the third sampling point in the combination is determined as the target audio amplitude value.

Optionally, the audio amplitude value of any sampling point can be obtained. One second sampling point is selected from the second sampling points in the second sampling point set successively according to a time sequence from late to early, one third sampling point is selected from the third sampling points in the third sampling point set successively according to a time sequence from late to early, and the second and third sampling points selected at the same n-th time are combined to obtain a combination. An average value of the second audio amplitude value of the second sampling point in the combination and the third audio amplitude value of the third sampling point in the combination is determined as the target audio amplitude value.

Optionally, the audio amplitude value of any sampling point can be obtained. One second sampling point is selected from the second sampling points in the second sampling point set successively according to a time sequence from late to early, one third sampling point is selected from the third sampling points in the third sampling point set successively according to a time sequence from early to late, and the second and third sampling points selected at the same n-th time are combined to obtain a combination. An average value of the second audio amplitude value of the second sampling point in the combination and the third audio amplitude value of the third sampling point in the combination is determined as the target audio amplitude value.

In S302, the target audio data of the first sampling points is generated based on the target audio amplitude values corresponding respectively to the first sampling points.

The target audio amplitude value contains the volume and frequency information of the audio source, which can be used to recovery the target audio data. The acquired audio amplitude value is inserted into the corresponding first sampling point, to generate the target audio data.

In the embodiment of the disclosure, the target audio amplitude values corresponding respectively to the first sampling points are obtained according to the first audio data sampled at the second sampling point and the second audio data sampled at the third sampling point. The target audio data of the first sampling points is generated based on the target audio amplitude values corresponding respectively to the first sampling points. In the embodiment of the disclosure, the target audio amplitude value is obtained according to the audio data collected prior to and behind the packet loss position, to further generate the target audio data. The process of generating the target audio data is refined and decomposed to obtain more accurate data results.

Figure 4:
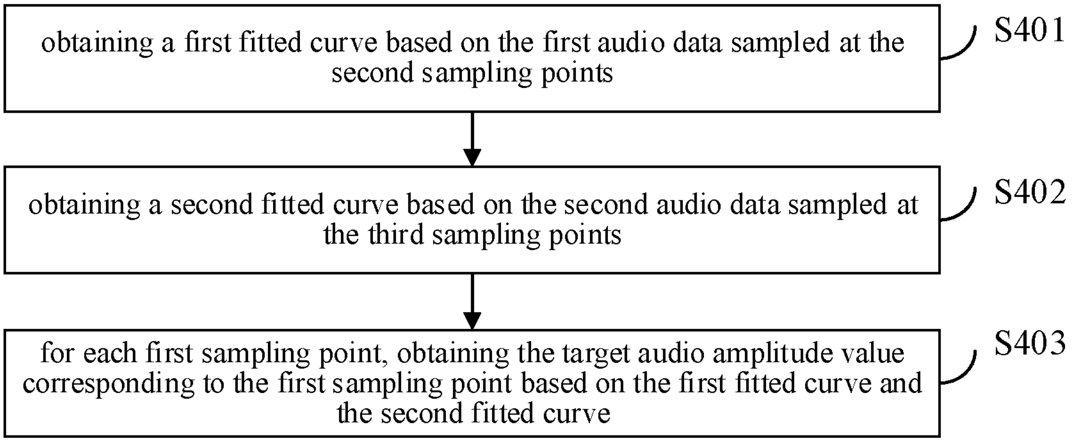
FIG. 4 is a flowchart of a packet loss recovery method for an audio data packet according to an embodiment of the disclosure.

FIG. 4 is a flowchart of a packet loss recovery method for an audio data packet according to an embodiment of the disclosure. On the basis of the above embodiments, in combination with FIG. 4, the process of obtaining the corresponding audio frequency amplitude value of each first sampling point according to the generated fitted curve is explained as follows. The process includes the following steps.

In S401, a first fitted curve is obtained based on the first audio data sampled at the second sampling points.

The x-axis represents sampling time points of the second sampling points and the y-axis represents audio amplitude values of the second sampling points. Each second sampling point can be regarded as a data point, and the function of the first fitted curve, i.e., $\varphi_1=a_0+a_1x+\ldots+a_kx^k$, can be obtained by the least square method to achieve the smallest deviation between the fitted curve and the real value. $a_0, a_1, \ldots a_k$ represent k parameters to be determined. For example, the k parameters can be determined to ensure that for any x value, a deviation between a real amplitude value y corresponding to the x value and the $\varphi$ value obtained by the function is the smallest.

The least square method (also known as the method of least square) is a mathematical optimization technique, it finds the best functional match for the data by minimizing a sum of squared errors. Unknown data can be easily obtained by using the least square method, and the sum of squared errors between the obtained data and the actual data can be minimized. The least square method can also be used for curve fitting. Some other optimization problems can also be expressed by the least square method in the form of minimizing energy or maximizing entropy.

In S402, a second fitted curve is obtained based on the second audio data sampled at the third sampling points.

For a specific implementation of obtaining the second fitted curve according to the second audio data, reference may be made to the relevant introduction of obtaining the first fitted curve according to the first audio data in S401, which will not be repeated here.

The function of the second fitted curve is: $\varphi_2=b_0+b_1 x+\ldots+b_k x^k$. $b_0, b_p \ldots b_k$ represent k parameters to be determined.

In S403, for each first sampling point, the target audio amplitude value corresponding to the first sampling point is obtained based on the first fitted curve and the second fitted curve.

In the disclosure, the x value in the first fitted curve and the second fitted curve represents the sampling time point. The sampling time point of the first sampling point is obtained and input into the first fitted curve and the second fitted curve, to obtain a first fitted amplitude value $\varphi_1$ and a second fitted amplitude value $\varphi_2$ corresponding to the sampling time point. The target audio amplitude value can be determined according to the first fitted amplitude value and the second fitted amplitude value.

In some embodiments, an average amplitude value of the first fitted amplitude value and the second fitted amplitude value is directly determined as the target audio amplitude value, that is, the target audio amplitude value $$V=\frac{\varphi_1+\varphi_2}{2}.$$

In the embodiment of the disclosure, the first fitted curve is obtained according to the first audio data sampled at the second sampling points, the second fitted curve is obtained according to the second audio data sampled at the third sampling points. For each first sampling point, the target audio amplitude value corresponding to the first sampling point is obtained based on the first fitted curve and the second fitted curve. In the embodiment of the disclosure, fitted curves of the first audio data and the second audio data are generated. The target audio amplitude value is obtained based on the fitted curves, and the target audio amplitude value is obtained by a mathematical model, so that the obtained data is more accurate and real.

Figure 5:
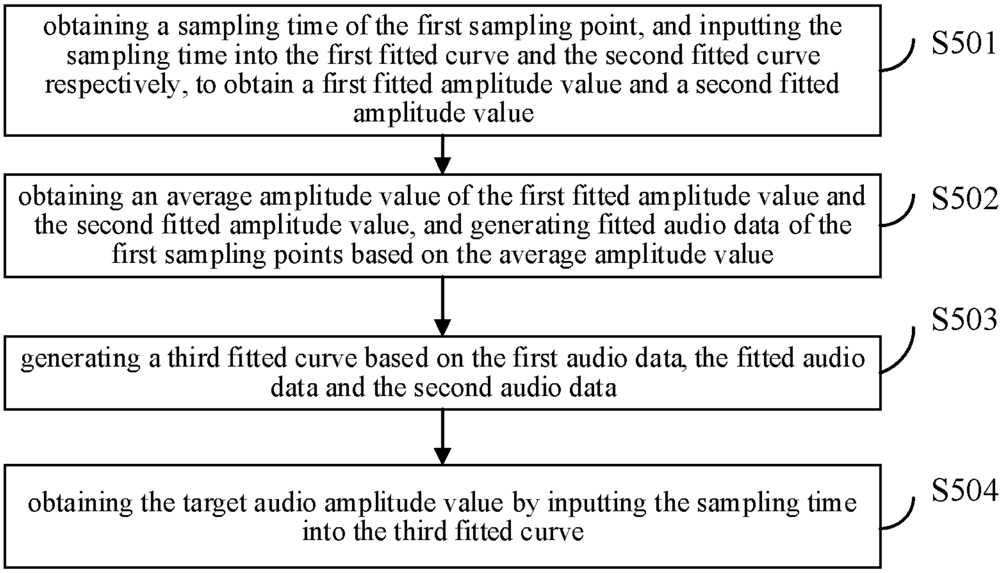
FIG. 5 is a flowchart of a packet loss recovery method for an audio data packet according to an embodiment of the disclosure.

FIG. 5 is a flowchart of a packet loss recovery method for an audio data packet according to an embodiment of the disclosure. Based on the above embodiments, in order to make the generated amplitude value curve smoother, in other implementations, after obtaining the average amplitude value of the first fitted amplitude value and the second fitted amplitude value, a binomial fitting is performed on a total of 3N time points corresponding to the generated amplitude value curve, the process includes the following steps.

In S501, a sampling time point of the first sampling point is obtained, and the sampling time point is input into the first fitted curve and the second fitted curve, to obtain a first fitted amplitude value and a second fitted amplitude value.

For a specific implementation of step S501, reference may be made to relevant introductions in various embodiments of the disclosure, and details are not repeated here.

In S502, an average amplitude value of the first fitted amplitude value and the second fitted amplitude value is obtained, and fitted audio data of the first sampling points is generated based on the average amplitude value.

Each first sampling time point (the sampling time point of each first sampling point) has its corresponding first fitted amplitude value and second fitted amplitude value, the average amplitude value is calculated based on these two fitted amplitude values, to obtain the fitted audio amplitude value of each first sampling point, and the fitted audio data of each first sampling point can be generated according to the fitted audio amplitude value.

In S503, a third fitted curve is generated based on the first audio data, the fitted audio data and the second audio data.

At this time, the generated fitted audio amplitude value curve is not smooth. In order to make the recovered audio data more real and noise-free, a binomial fitting is performed according to the adjacent 3N time points of the first audio data, the fitted audio data and the second audio data, to generate the third fitted curve $\varphi_3=c_0+c_1 x+\ldots+c_k x^k$. $c_0, c_1, \ldots c_k$ represent k parameters to be determined.

For the process of generating the third fitted curve, reference may be made to the process of generating the first fitted curve in S401, which will not be repeated here.

In S504, the target audio amplitude value is obtained by inputting the sampling time point into the third fitted curve.

In the disclosure, x is the sampling time point in the third fitted curve, the sampling time point of the first sampling point is obtained and input into the third fitted curve, to directly obtain the target audio amplitude value corresponding to the sampling time point.

In the embodiment of the disclosure, the sampling time point of the first sampling point is obtained, and the sampling time point is input into the first fitted curve and the second fitted curve respectively, to obtain the first fitted amplitude value and the second fitted amplitude value. The average amplitude value of the first fitted amplitude value and the second fitted amplitude value is obtained. Based on the average amplitude value, the fitted audio data of the first sampling points is generated. The third fitted curve is generated based on the first audio data, the fitted audio data and the second audio data. The target audio amplitude value is obtained by inputting the sampling time point into the third fitted curve. In the embodiment of the disclosure, after the fitted audio data is obtained based on the first audio data and the second audio data, the data of the 3N time points are re-fitted, to further obtain a smoother target audio amplitude value curve, so that the recovered audio data is more realistic and noise-free.

Figure 6:
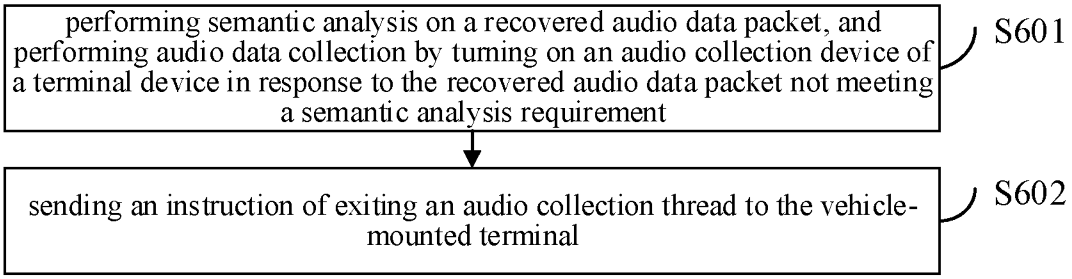
FIG. 6 is a flowchart of a packet loss recovery method for an audio data packet according to an embodiment of the disclosure.

FIG. 6 is a flowchart of a packet loss recovery method for an audio data packet according to an embodiment of the disclosure. On the basis of the above embodiments, after inserting the target audio data at the sampling position of the first sampling point, as shown in FIG. 6, the method further includes the following steps.

In S601, semantic analysis is performed on a recovered audio data packet, and audio data collection is performed by turning on an audio collection device of a terminal device in response to the recovered audio data packet not meeting a semantic analysis requirement.

The recovered audio data packet is sent to a speech engine for identification, and it is determined whether the recovered recorded data of the vehicle-mounted terminal meets requirements of the speech engine. If the speech engine cannot recognize the speech data in the audio data packet, it proves that the noise of the audio data packet is still too large and does not meet the semantic analysis requirement.

In this case, the audio collection device of the terminal device is turned on to collect the audio data. Optionally, the audio collection device may be a microphone or a pickup on the terminal device.

Optionally, the vehicle-mounted terminal can issue a voice prompt or a text prompt to the user to remind the user that the audio collection device has been changed due to a poor quality of the audio source, and a repeated voice command is required.

In S602, an instruction of exiting an audio collection thread is sent to the vehicle-mounted terminal.

Based on a connection mode, the mobile terminal sends the instruction of exiting the audio collection thread to the vehicle-mounted terminal, and the vehicle-mounted terminal closes the audio collection device after receiving the instruction.

In the embodiment of the disclosure, semantic analysis is performed on the recovered audio data packet, audio data collection is carried out by turning on the audio collection device of the terminal device in response to the recovered audio data packet not meeting the semantic analysis requirement. The instruction of exiting the audio collection thread is sent to the vehicle-mounted terminal. In the embodiment of the disclosure, when the audio data packet obtained by the packet loss recovery still cannot meet the requirements of the speech engine, then the audio collection device is changed for audio collection, which can solve the problem of poor contact of the vehicle microphone or too much noise which seriously affects a quality of the recorded audio.

Figure 7:
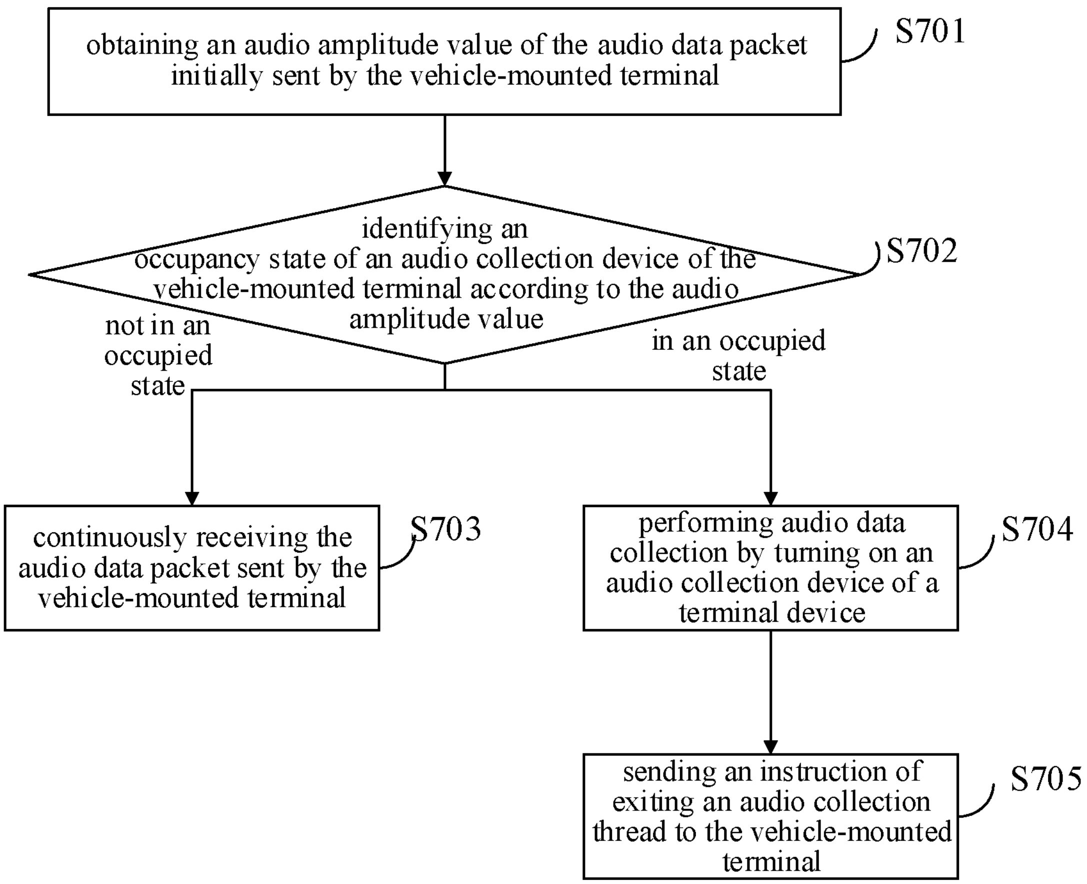
FIG. 7 is a flowchart of a packet loss recovery method for an audio data packet according to an embodiment of the disclosure.

In the above embodiments, the packet loss recovery strategy when the vehicle-mounted terminal sends the audio data packet to the terminal device is introduced, if the audio collection device of the vehicle-mounted terminal is occupied, then the audio data cannot be collected and sent to the terminal device, the audio collection device need to be changed. Before changing the audio collection device, it is determined whether the audio collection device of the vehicle-mounted terminal is occupied. FIG. 7 is a flowchart of a packet loss recovery method for an audio data packet according to an embodiment of the disclosure. As illustrated in FIG. 7, the method includes the following steps.

In S701, an audio amplitude value of the audio data packet initially sent by the vehicle-mounted terminal is obtained.

After the vehicle-mounted terminal is connected to the terminal device, the microphone of the vehicle-mounted terminal is activated first to start recording. After the recording is completed, the vehicle-mounted terminal sends the audio data packet to the terminal device, and the terminal device obtains the audio amplitude value of the audio data packet.

In S702, an occupancy state of an audio collection device of the vehicle-mounted terminal is identified according to the audio amplitude value.

It is determined whether an audio value obtained by a receiver is greater than a given threshold. If the value is greater than or equal to the threshold, it indicates that the recorded data is normal and the audio collection device of the vehicle is not occupied. If the value is less than the threshold, it indicates that there is a problem with the recorded data of the vehicle and the audio collection device is in an occupied state.

Under normal circumstances, the threshold is a minimum audio amplitude value when the audio collection device of the vehicle is not occupied. The threshold can be obtained through extensive experimental training.

In response to the audio collection device not being in the occupied state, S703 is executed. In response to the audio collection device being in the occupied state, S704 is executed.

In S703, the audio data packet sent by the vehicle-mounted terminal is continuously received.

The mobile terminal continues to receive the audio data packet sent by the vehicle-mounted terminal.

In S704, audio data collection is performed by turning on an audio collection device of the terminal device.

The audio collection device of the terminal device itself is turned on to collect the audio data. Optionally, the audio collection device may be a mobile phone or a Bluetooth headset or other electronic device.

Optionally, the vehicle can issue a voice prompt or a text prompt to the user, to remind the user that since the audio collection device of the vehicle-mounted terminal has been occupied, it has been replaced with the audio collection device of the mobile terminal, and a repeated voice command is required.

In S705, an instruction of exiting an audio collection thread is sent to the vehicle-mounted terminal.

For a specific implementation of step S705, reference may be made to relevant introductions in various embodiments of the disclosure, and details are not repeated here.

In the embodiment of the disclosure, the audio amplitude value of the audio data packet initially sent by the vehicle-mounted terminal is received. The occupancy state of the audio collection device of the vehicle-mounted terminal is identified according to the audio amplitude value. The audio data packet sent is received continuously by the vehicle-mounted terminal in response to the audio collection device being not in the occupied state. The audio data collection is performed by turning on the audio collection device of the terminal device in response to the audio collection device of the vehicle-mounted terminal being in the occupied state. The instruction of exiting the audio collection thread is sent to the vehicle-mounted terminal. In the embodiment of the disclosure, it is determined whether the audio collection device of the vehicle terminal is in the occupied state, and when it is in the occupied state, it is replaced by the audio collection device of the mobile device for audio collection, which solves the problem that a voice function cannot be used when the vehicle microphone is occupied or unavailable.

Figure 8:
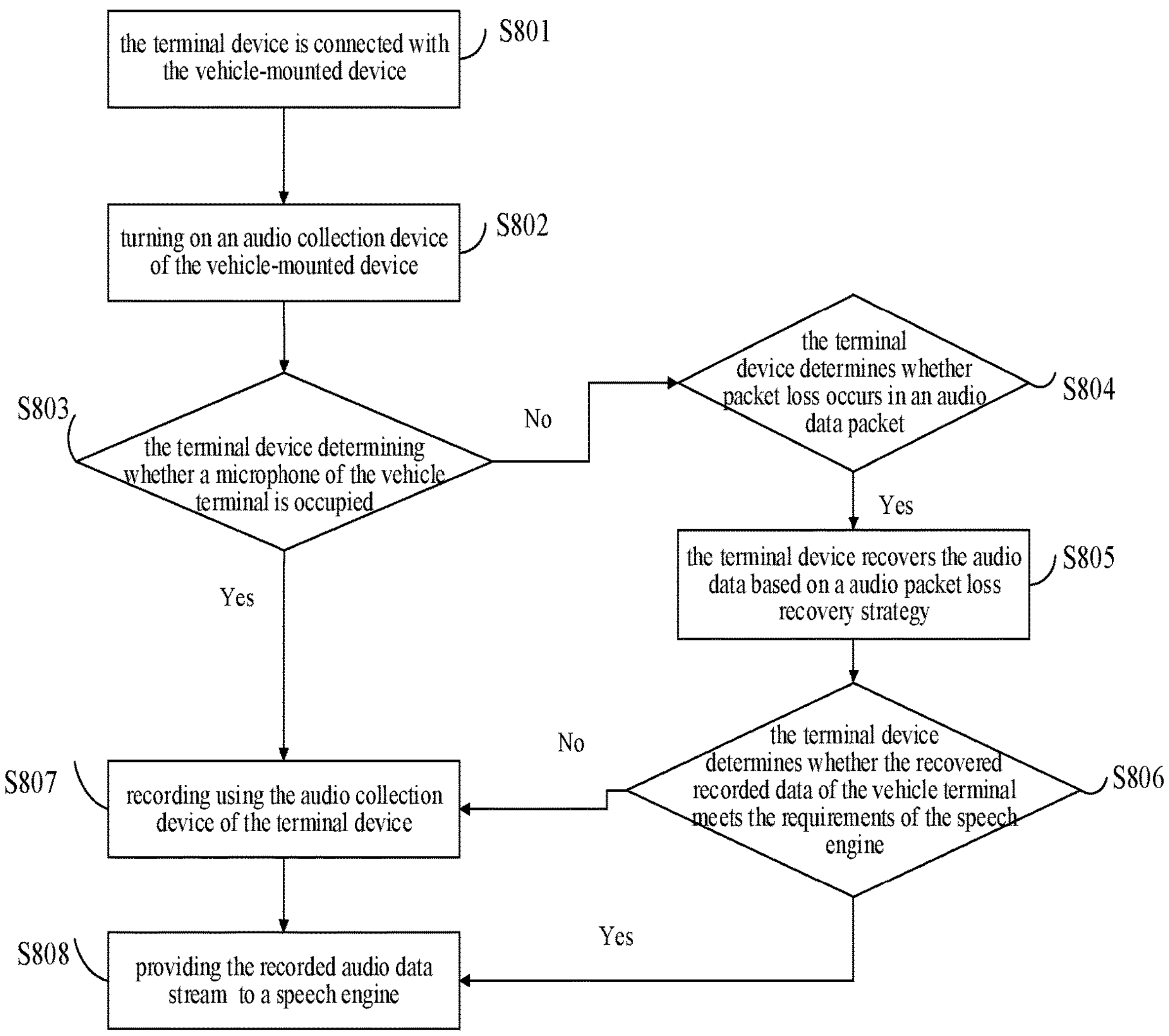
FIG. 8 is a flowchart of a packet loss recovery method for an audio data packet according to an embodiment of the disclosure.

FIG. 8 is a flowchart of a packet loss recovery method for an audio data packet according to an embodiment of the disclosure. As illustrated in FIG. 8, Based on the packet loss recovery method for an audio data packet according to the disclosure, the packet loss recovery method for the audio data packet includes the following steps under a practical application scenario.

In S801, a terminal device is connected with a vehicle-mounted terminal.

In S802, after the connection is established, an audio collection device of the vehicle-mounted terminal starts to record.

In S803, the terminal device determines whether a microphone of the vehicle-mounted terminal is occupied, if it is not occupied, S804 is executed, otherwise S807 is executed.

In S804, the terminal device determines whether a packet loss occurs in an audio data packet.

The terminal device identifies adjacent two pieces of audio data from the audio data packet, and a first sampling time point and a second sampling time point corresponding respectively to the two pieces of audio data. Since the audio packet should be continuous in time, it is possible to determine whether the packet loss occurs based on time. When the first sampling time point and the second sampling time point is not continuous, it indicates that the packet loss occurs in the audio data packet. A discarded sampling time point between the first sampling time point and the second sampling time point is obtained, where one discarded sampling time point corresponds to one first sampling point, and the first sampling point set includes N first sampling points, where N is a positive integer.

If the packet loss occurs, S805 is executed.

In S805, the terminal device recovers audio data based on an audio packet loss recovery strategy.

The audio packet loss recovery strategy is a strategy of recovering the target audio data according to the first audio data and the second audio data described in the above embodiments.

In S806, the terminal device determines whether the recovered recorded data of the vehicle terminal meets requirements of a speech engine.

If the requirements are not met, S807 is executed. If the requirements are met, S808 is executed.

In S807, an audio collection device of the terminal device is used to record.

In S808, a recorded audio data stream is provided to the speech engine.

In the embodiment of the disclosure, the mobile device is connected to the vehicle-mounted terminal. After the connection is established, the audio collection device of the vehicle-mounted terminal is started to record audio by default. When the audio collection device of the vehicle-mounted terminal is occupied, the audio collection device of the terminal device is automatically selected for audio recording. When the audio collection device of the vehicle-mounted terminal is not occupied and the packet loss occurs in the audio data, the audio packet loss recovery strategy is used to recover the audio data. If the recovered recorded data still cannot meet the requirements of the speech engine, it is required to use the audio collection device of the terminal device to record audio, and finally the recorded audio data that meets the requirements is provided to the speech engine. In the embodiment of the disclosure, the audio data is recovered based on the audio packet loss recovery strategy, and an appropriate audio collection device can be automatically selected by determining the audio data, which effectively solves the problem of packet loss of the audio transmission data of the vehicle, the problem that audio recording quality is affected seriously due to poor contact of the audio collection device of the vehicle-mounted terminal or too much noise, and the problem that the voice function is unavailable when the audio collection device of the vehicle-mounted terminal is occupied or unavailability, thereby greatly improving the user experience.

Figure 9:
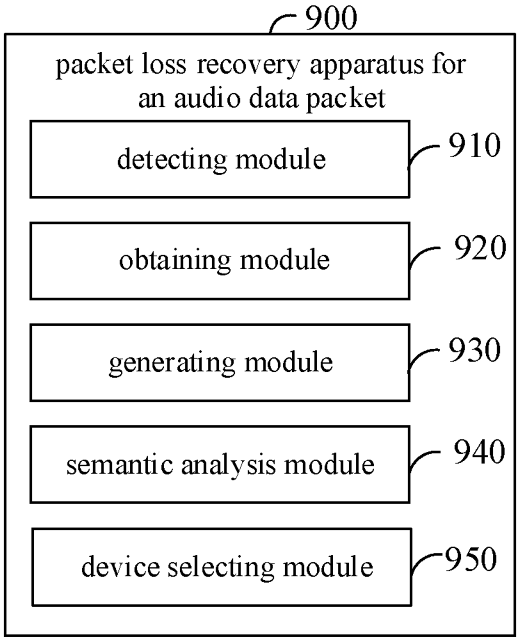
FIG. 9 is a block diagram of a packet loss recovery apparatus for an audio data packet according to an embodiment of the disclosure.

FIG. 9 is a structure diagram of a packet loss recovery apparatus for an audio data packet according to an embodiment of the disclosure. As illustrated in FIG. 9, the packet loss recovery apparatus 900 for an audio data packet includes: a detecting module 910, an obtaining module 920 and a generating module 930.

The detecting module 910 is configured to receive an audio data packet sent by a vehicle-mounted terminal, and identify a discarded first sampling point set in response to detecting packet loss. The first sampling point set includes N first sampling points, and N is a positive integer.

The obtaining module 920 is configured to obtain a second sampling point set and a third sampling point set each adjacent to the first sampling point set. The second sampling point set is prior to the first sampling point set, the third sampling point set is behind the first sampling point set. The second sampling point set includes at least N second sampling points, and the third sampling point set includes at least N third sampling points.

The generating module 930 is configured to generate target audio data of the first sampling point based on first audio data sampled at the second sampling points and second audio data sampled at the third sampling points, and insert the target audio data at sampling positions of the first sampling points.

In the embodiment of the disclosure, the lost N data packets are recovered based on the adjacent N data packets prior to and adjacent N data packets behind the packet loss position, which solves the problem of packet loss of audio transmission data of the vehicle and improves a quality of the audio source.

It should be noted that the foregoing explanations of the embodiment of the packet loss recovery method for an audio data packet are also applicable to the packet loss recovery apparatus for an audio data packet in this embodiment, which will not be repeated here.

In a possible implementation of the embodiments of the disclosure, the generating module 903 is further configured to: obtain target audio amplitude values corresponding respectively to the first sampling points based on the first audio data sampled at the second sampling points and the second audio data sampled at the third sampling points; and generate the target audio data of the first sampling points based on the target audio amplitude values corresponding respectively to the first sampling points.

In a possible implementation of the embodiments of the disclosure, the generating module 930 is further configured to: obtain a first fitted curve based on the first audio data sampled at the second sampling points; obtain a second fitted curve based on the second audio data sampled at the third sampling points; and for each first sampling point, obtain the target audio amplitude value corresponding to the first sampling point based on the first fitted curve and the second fitted curve.

In a possible implementation of the embodiments of the disclosure, the generating module 930 is further configured to: obtain a sampling time point of the first sampling point, and input the sampling time point into the first fitted curve and the second fitted curve respectively, to obtain a first fitted amplitude value and a second fitted amplitude value; and determine the target audio amplitude value corresponding to the first sampling point based on the first fitted amplitude value and the second fitted amplitude value.

In a possible implementation of the embodiments of the disclosure, the generating module 930 is further configured to: determine an average amplitude value of the first fitted amplitude value and the second fitted amplitude value as the target audio amplitude value.

In a possible implementation of the embodiments of the disclosure, the generating module 930 is further configured to: obtain an average amplitude value of the first fitted amplitude value and the second fitted amplitude value, and generate fitted audio data of the first sampling points based on the average amplitude value; generate a third fitted curve based on the first audio data, the fitted audio data and the second audio data; and obtain the target audio amplitude value by inputting the sampling time point into the third fitted curve.

In a possible implementation of the embodiments of the disclosure, the generating module 930 is further configured to: for any sampling point in the second sampling point set or the third sampling point set, obtain an audio amplitude value of the sampling point; obtain a combination by combining one second sampling point in the second sampling point set with one third sampling point in the third sampling point set; and determine an average value of a second audio amplitude value of the second sampling point in the combination and a third audio amplitude value of the third sampling point in the combination as the target audio amplitude value.

In a possible implementation of the embodiments of the disclosure, the detecting module 910 is further configured to: identify adjacent two pieces of audio data from the audio data packet, and a first sampling time point and a second sampling time point corresponding respectively to the two pieces of audio data; and obtain a discarded sampling time point between the first sampling time point and the second sampling time point in response to the first sampling time point and the second sampling time point being discontinuous, in which each first sampling point corresponds to one discarded sampling time point.

In a possible implementation of the embodiments of the disclosure, the packet loss recovery apparatus 900 for an audio data packet further includes: a semantic analysis module 940. The semantic analysis module 940 is configured to: perform semantic analysis on a recovered audio data packet, and perform audio data collection by turning on an audio collection device of a terminal device in response to the recovered audio data packet not meeting a semantic analysis requirement; and send an instruction of exiting an audio collection thread to the vehicle-mounted terminal.

In a possible implementation of the embodiments of the disclosure, the packet loss recovery apparatus 900 for an audio data packet further includes: a device selecting module 950. The device selecting module 950 is configured to: obtain an audio amplitude value of the audio data packet initially sent by the vehicle-mounted terminal; identify an occupancy state of an audio collection device of the vehicle-mounted terminal according to the audio amplitude value; and continuously receive the audio data packet sent by the vehicle-mounted terminal in response to the audio collection device being not in an occupied state.

In a possible implementation of the embodiments of the disclosure, the device selecting module 950 is further configured to: perform audio data collection by turning on an audio collection device of a terminal device in response to the audio collection device of the vehicle-mounted terminal being in the occupied state; and send an instruction of exiting an audio collection thread to the vehicle-mounted terminal.

In the technical solution of the disclosure, the acquisition, storage and application of the user's personal information involved are all in compliance with the provisions of relevant laws and regulations, and do not violate public order and good customs.

According to the embodiments of the disclosure, the disclosure also provides an electronic device, a readable storage medium and a computer program product.

Figure 10:
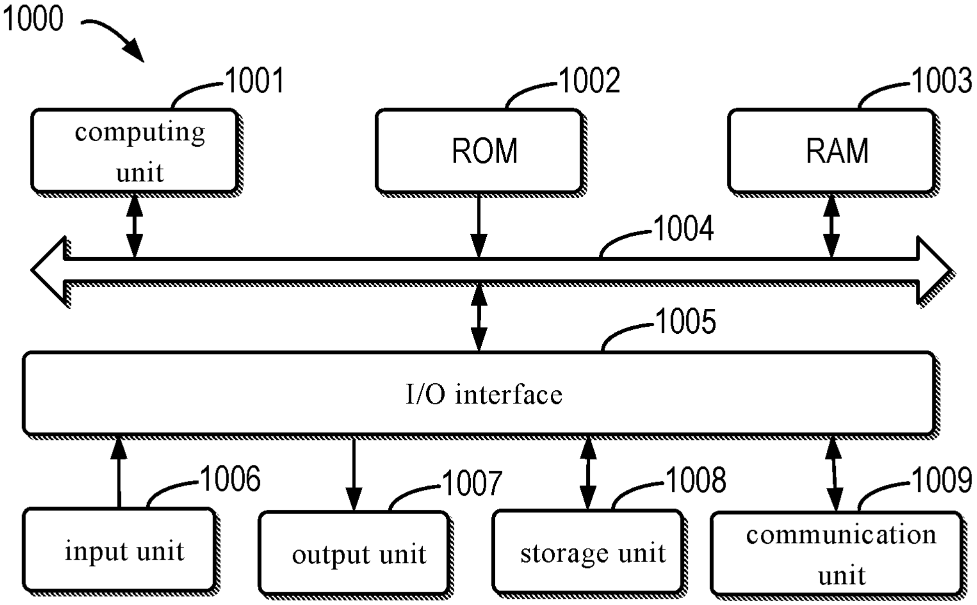
FIG. 10 is a block diagram of an electronic device used to implement the packet loss recovery method for an audio data packet according to an embodiment of the disclosure.

FIG. 10 is a block diagram of an example electronic device 1000 used to implement the embodiments of the disclosure. Electronic devices are intended to represent various forms of digital computers, such as laptop computers, desktop computers, workbenches, personal digital assistants, servers, blade servers, mainframe computers, and other suitable computers. Electronic devices may also represent various forms of mobile devices, such as personal digital processing, cellular phones, smart phones, wearable devices, and other similar computing devices. The components shown here, their connections and relations, and their functions are merely examples, and are not intended to limit the implementation of the disclosure described and/or required herein.

As illustrated in FIG. 10, the device 1000 includes a computing unit 1001 performing various appropriate actions and processes based on computer programs stored in a read-only memory (ROM) 1002 or computer programs loaded from the storage unit 1008 to a random access memory (RAM) 1003. In the RAM 1003, various programs and data required for the operation of the device 1000 are stored. The computing unit 1001, the ROM 1002, and the RAM 1003 are connected to each other through a bus 1004. An input/output (I/O) interface 1005 is also connected to the bus 1004.

Components in the device 1000 are connected to the I/O interface 1005, including: an inputting unit 1006, such as a keyboard, a mouse; an outputting unit 1007, such as various types of displays, speakers; a storage unit 1008, such as a disk, an optical disk; and a communication unit 1009, such as network cards, modems, and wireless communication transceivers. The communication unit 1009 allows the device 1000 to exchange information/data with other devices through a computer network such as the Internet and/or various telecommunication networks.

The computing unit 1001 may be various general-purpose and/or dedicated processing components with processing and computing capabilities. Some examples of computing unit 1001 include, but are not limited to, a central processing unit (CPU), a graphics processing unit (GPU), various dedicated AI computing chips, various computing units that run machine learning model algorithms, and a digital signal processor (DSP), and any appropriate processor, controller and microcontroller. The computing unit 1001 executes the various methods and processes described above, such as the packet loss recovery method for an audio data packet. For example, in some embodiments, the method may be implemented as a computer software program, which is tangibly contained in a machine-readable medium, such as the storage unit 1008. In some embodiments, part or all of the computer program may be loaded and/or installed on the device 1000 via the ROM 1002 and/or the communication unit 1009. When the computer program is loaded on the RAM 1003 and executed by the computing unit 1001, one or more steps of the method described above may be executed. Alternatively, in other embodiments, the computing unit 1001 may be configured to perform the method in any other suitable manner (for example, by means of firmware).

Various implementations of the systems and techniques described above may be implemented by a digital electronic circuit system, an integrated circuit system, Field Programmable Gate Arrays (FPGAs), Application Specific Integrated Circuits (ASICs), Application Specific Standard Products (ASSPs), System on Chip (SOCs), Load programmable logic devices (CPLDs), computer hardware, firmware, software, and/or a combination thereof. These various embodiments may be implemented in one or more computer programs, the one or more computer programs may be executed and/or interpreted on a programmable system including at least one programmable processor, which may be a dedicated or general programmable processor for receiving data and instructions from the storage system, at least one input device and at least one output device, and transmitting the data and instructions to the storage system, the at least one input device and the at least one output device.

The program code configured to implement the method of the disclosure may be written in any combination of one or more programming languages. These program codes may be provided to the processors or controllers of general-purpose computers, dedicated computers, or other programmable data processing devices, so that the program codes, when executed by the processors or controllers, enable the functions/operations specified in the flowchart and/or block diagram to be implemented. The program code may be executed entirely on the machine, partly executed on the machine, partly executed on the machine and partly executed on the remote machine as an independent software package, or entirely executed on the remote machine or server.

In the context of the disclosure, a machine-readable medium may be a tangible medium that may contain or store a program for use by or in connection with an instruction execution system, apparatus, or device. The machine-readable medium may be a machine-readable signal medium or a machine-readable storage medium. A machine-readable medium may include, but is not limited to, an electronic, magnetic, optical, electromagnetic, infrared, or semiconductor system, apparatus, or device, or any suitable combination of the foregoing. More specific examples of machine-readable storage media include electrical connections based on one or more wires, portable computer disks, hard disks, random access memories (RAM), read-only memories (ROM), electrically programmable read-only-memory (EPROM), flash memory, fiber optics, compact disc read-only memories (CD-ROM), optical storage devices, magnetic storage devices, or any suitable combination of the foregoing.

In order to provide interaction with a user, the systems and techniques described herein may be implemented on a computer having a display device (e.g., a Cathode Ray Tube (CRT) or a Liquid Crystal Display (LCD) monitor for displaying information to a user); and a keyboard and pointing device (such as a mouse or trackball) through which the user can provide input to the computer. Other kinds of devices may also be used to provide interaction with the user. For example, the feedback provided to the user may be any form of sensory feedback (e.g., visual feedback, auditory feedback, or haptic feedback), and the input from the user may be received in any form (including acoustic input, voice input, or tactile input).

The systems and technologies described herein can be implemented in a computing system that includes background components (for example, a data server), or a computing system that includes middleware components (for example, an application server), or a computing system that includes front-end components (for example, a user computer with a graphical user interface or a web browser, through which the user can interact with the implementation of the systems and technologies described herein), or include such background components, intermediate computing components, or any combination of front-end components. The components of the system may be interconnected by any form or medium of digital data communication (e.g., a communication network). Examples of communication networks include: local area network (LAN), wide area network (WAN), and the Internet.

The computer system may include a client and a server. The client and server are generally remote from each other and interacting through a communication network. The client-server relation is generated by computer programs running on the respective computers and having a client-server relation with each other. The server may be a cloud server, a server of a distributed system, or a server combined with a block-chain.

It should be understood that the various forms of processes shown above can be used to reorder, add or delete steps. For example, the steps described in the disclosure could be performed in parallel, sequentially, or in a different order, as long as the desired result of the technical solution disclosed in the disclosure is achieved, which is not limited herein.

The above specific embodiments do not constitute a limitation on the protection scope of the disclosure. Those skilled in the art should understand that various modifications, combinations, sub-combinations and substitutions can be made according to design requirements and other factors. Any modification, equivalent replacement and improvement made within the spirit and principle of the disclosure shall be included in the protection scope of the disclosure.

What is claimed is:

1. A packet loss recovery method for an audio data packet, comprising:

receiving, by a terminal device, an audio data packet sent by a vehicle-mounted terminal, and identifying, by the terminal device, a discarded first sampling point set in response to detecting packet loss, wherein the first sampling point set comprises N first sampling points, and N is a positive integer;

obtaining, by the terminal device, a second sampling point set and a third sampling point set each adjacent to the first sampling point set, wherein the second sampling point set is prior to the first sampling point set, the third sampling point set is behind the first sampling point set, the second sampling point set comprises at least N second sampling points, and the third sampling point set comprises at least N third sampling points;

generating, by the terminal device, target audio data of the first sampling points based on first audio data sampled at the second sampling points and second audio data sampled at the third sampling points; and inserting, by the terminal device, the target audio data at sampling positions of the first sampling points to obtain a recovered audio data packets;

wherein generating the target audio data of the first sampling points based on the first audio data sampled at the second sampling points and the second audio data sampled at the third sampling points, comprises:

obtaining target audio amplitude values corresponding respectively to the first sampling points based on the first audio data sampled at the second sampling points and the second audio data sampled at the third sampling points; and generating the target audio data of the first sampling points based on the target audio amplitude values corresponding respectively to the first sampling points;

wherein obtaining the target audio amplitude values corresponding respectively to the first sampling point based on the first audio data sampled at the second sampling points and the second audio data sampled at the third sampling points, comprises: for any sampling point in the second sampling point set or the third sampling point set, obtaining an audio amplitude value of the sampling point;

obtaining a combination by combining one second sampling point in the second sampling point set with one third sampling point in the third sampling point set; and determining an arithmetic mean of a second audio amplitude value of the second sampling point in the combination and a third audio amplitude value of the third sampling point in the combination as the target audio amplitude value.

2. The method of claim 1, wherein obtaining the target audio amplitude values corresponding respectively to the first sampling points based on the first audio data sampled at the second sampling points and the second audio data sampled at the third sampling points, comprises:

obtaining a first fitted curve based on the first audio data sampled at the second sampling points;

obtaining a second fitted curve based on the second audio data sampled at the third sampling points; and for each first sampling point, obtaining the target audio amplitude value corresponding to the first sampling point based on the first fitted curve and the second fitted curve.

3. The method of claim 2, wherein for each first sampling point, obtaining the target audio amplitude value corresponding to the first sampling point based on the first fitted curve and the second fitted curve, comprises:

obtaining a sampling time point of the first sampling point;

inputting the sampling time point into the first fitted curve and the second fitted curve respectively, to obtain a first fitted amplitude value and a second fitted amplitude value; and determining the target audio amplitude value corresponding to the first sampling point based on the first fitted amplitude value and the second fitted amplitude value.

4. The method of claim 3, wherein determining the target audio amplitude value corresponding to the first sampling point based on the first fitted amplitude value and the second fitted amplitude value, comprises:

determining an average amplitude value of the first fitted amplitude value and the second fitted amplitude value as the target audio amplitude value.

5. The method of claim 3, wherein determining the target audio amplitude value corresponding to the first sampling point based on the first fitted amplitude value and the second fitted amplitude value comprises:

obtaining an average amplitude value of the first fitted amplitude value and the second fitted amplitude value;

generating fitted audio data of the first sampling points based on the average amplitude value;

generating a third fitted curve based on the first audio data, the fitted audio data and the second audio data; and obtaining the target audio amplitude value by inputting the sampling time point into the third fitted curve.

6. The method of claim 1, wherein identifying the discarded first sampling point set comprises:

identifying adjacent two pieces of audio data from the audio data packet, and a first sampling time point and a second sampling time point corresponding respectively to the two pieces of audio data; and obtaining a discarded sampling time point between the first sampling time point and the second sampling time point in response to the first sampling time point and the second sampling time point being discontinuous, wherein each first sampling point corresponds to one discarded sampling time point.

7. The method of claim 1, wherein after inserting the target audio data at sampling positions of the first sampling points, the method further comprises:

performing semantic analysis on the recovered audio data packet;

performing audio data collection by turning on an audio collection device of the terminal device in response to the recovered audio data packet not meeting a semantic analysis requirement; and sending an instruction of exiting an audio collection thread to the vehicle-mounted terminal.

8. The method of claim 1, further comprising:

obtaining an audio amplitude value of the audio data packet initially sent by the vehicle-mounted terminal;

identifying an occupancy state of an audio collection device of the vehicle-mounted terminal according to the audio amplitude value; and continuously receiving the audio data packet sent by the vehicle-mounted terminal in response to the audio collection device being not in an occupied state.

9. The method of claim 8, further comprising:

performing audio data collection by turning on an audio collection device of the terminal device in response to the audio collection device of the vehicle-mounted terminal being in the occupied state; and sending an instruction of exiting an audio collection thread to the vehicle-mounted terminal.

10. An electronic device, comprising:

at least one processor; and a memory communicatively coupled to the at least one processor; wherein, the memory stores instructions executable by the at least one processor, when the instructions are executed by the at least one processor, the at least one processor is enabled to performing the following:

receiving an audio data packet sent by a vehicle-mounted terminal, and identifying a discarded first sampling point set in response to detecting packet loss, wherein the first sampling point set comprises N first sampling points, and N is a positive integer;

obtaining a second sampling point set and a third sampling point set each adjacent to the first sampling point set, wherein the second sampling point set is prior to the first sampling point set, the third sampling point set is behind the first sampling point set, the second sampling point set comprises at least N second sampling points, and the third sampling point set comprises at least N third sampling points;

generating target audio data of the first sampling points based on first audio data sampled at the second sampling points and second audio data sampled at the third sampling points; and inserting the target audio data at sampling positions of the first sampling points to obtain a recovered audio data packet;

wherein generating the target audio data of the first sampling points based on the first audio data sampled at the second sampling points and the second audio data sampled at the third sampling points, comprises:

obtaining target audio amplitude values corresponding respectively to the first sampling points based on the first audio data sampled at the second sampling points and the second audio data sampled at the third sampling points; and generating the target audio data of the first sampling points based on the target audio amplitude values corresponding respectively to the first sampling points;

wherein obtaining the target audio amplitude values corresponding respectively to the first sampling point based on the first audio data sampled at the second sampling points and the second audio data sampled at the third sampling points, comprises:

for any sampling point in the second sampling point set or the third sampling point set, obtaining an audio amplitude value of the sampling point;

obtaining a combination by combining one second sampling point in the second sampling point set with one third sampling point in the third sampling point set; and determining an arithmetic mean of a second audio amplitude value of the second sampling point in the combination and a third audio amplitude value of the third sampling point in the combination as the target audio amplitude value.

11. The device of claim 10, wherein obtaining the target audio amplitude values corresponding respectively to the first sampling points based on the first audio data sampled at the second sampling points and the second audio data sampled at the third sampling points, comprises:

obtaining a first fitted curve based on the first audio data sampled at the second sampling points;

obtaining a second fitted curve based on the second audio data sampled at the third sampling points; and for each first sampling point, obtaining the target audio amplitude value corresponding to the first sampling point based on the first fitted curve and the second fitted curve.

12. The device of claim 11, wherein for each first sampling point, obtaining the target audio amplitude value corresponding to the first sampling point based on the first fitted curve and the second fitted curve, comprises:

obtaining a sampling time point of the first sampling point;

inputting the sampling time point into the first fitted curve and the second fitted curve respectively, to obtain a first fitted amplitude value and a second fitted amplitude value; and determining the target audio amplitude value corresponding to the first sampling point based on the first fitted amplitude value and the second fitted amplitude value.

13. The device of claim 12, wherein determining the target audio amplitude value corresponding to the first sampling point based on the first fitted amplitude value and the second fitted amplitude value, comprises:

determining an average amplitude value of the first fitted amplitude value and the second fitted amplitude value as the target audio amplitude value.

14. The device of claim 12, wherein determining the target audio amplitude value corresponding to the first sampling point based on the first fitted amplitude value and the second fitted amplitude value comprises:

obtaining an average amplitude value of the first fitted amplitude value and the second fitted amplitude value;

generating fitted audio data of the first sampling points based on the average amplitude value;

generating a third fitted curve based on the first audio data, the fitted audio data and the second audio data; and obtaining the target audio amplitude value by inputting the sampling time point into the third fitted curve.

15. The device of claim 10, wherein identifying the discarded first sampling point set comprises:

identifying adjacent two pieces of audio data from the audio data packet, and a first sampling time point and a second sampling time point corresponding respectively to the two pieces of audio data; and obtaining a discarded sampling time point between the first sampling time point and the second sampling time point in response to the first sampling time point and the second sampling time point being discontinuous, wherein each first sampling point corresponds to one discarded sampling time point.

16. A non-transitory computer readable storage medium storing computer instructions, wherein the computer instructions are configured to cause a computer to performing the following:

receiving an audio data packet sent by a vehicle-mounted terminal, and identifying a discarded first sampling point set in response to detecting packet loss, wherein the first sampling point set comprises N first sampling points, and N is a positive integer;

obtaining a second sampling point set and a third sampling point set each adjacent to the first sampling point set, wherein the second sampling point set is prior to the first sampling point set, the third sampling point set is behind the first sampling point set, the second sampling point set comprises at least N second sampling points, and the third sampling point set comprises at least N third sampling points;

generating target audio data of the first sampling points based on first audio data sampled at the second sampling points and second audio data sampled at the third sampling points; and inserting the target audio data at sampling positions of the first sampling points to obtain a recovered audio data packet;

wherein generating the target audio data of the first sampling points based on the first audio data sampled at the second sampling points and the second audio data sampled at the third sampling points, comprises:

obtaining target audio amplitude values corresponding respectively to the first sampling points based on the first audio data sampled at the second sampling points and the second audio data sampled at the third sampling points; and generating the target audio data of the first sampling points based on the target audio amplitude values corresponding respectively to the first sampling points;

wherein obtaining the target audio amplitude values corresponding respectively to the first sampling point based on the first audio data sampled at the second sampling points and the second audio data sampled at the third sampling points, comprises:

for any sampling point in the second sampling point set or the third sampling point set, obtaining an audio amplitude value of the sampling point;

obtaining a combination by combining one second sampling point in the second sampling point set with one third sampling point in the third sampling point set; and determining an arithmetic mean of a second audio amplitude value of the second sampling point in the combination and a third audio amplitude value of the third sampling point in the combination as the target audio amplitude value.

* * * * *